US012777561B2

(12) United States Patent
Moloney

(10) Patent No.: US 12,777,561 B2
(45) Date of Patent: Oct. 27, 2026

(54) HEATING ELEMENT

(71) Applicant: NICOVENTURES TRADING LIMITED, London (GB)

(72) Inventor: Patrick Moloney, London (GB)

(73) Assignee: NICOVENTURES TRADING LIMITED, London (GB)

( * ) Notice: Subject to any disclaimer, the term of this patent is extended or adjusted under 35 U.S.C. 154(b) by 1056 days.

(21) Appl. No.: 17/597,492

(22) PCT Filed: Jun. 30, 2020

(86) PCT No.: PCT/EP2020/068384

§ 371 (c)(1),
(2) Date: Jan. 7, 2022

(87) PCT Pub. No.: WO2021/004837

PCT Pub. Date: Jan. 14, 2021

(65) Prior Publication Data

US 2022/0272797 A1 Aug. 25, 2022

(30) Foreign Application Priority Data

Jul. 8, 2019 (GB) .................................... 1909772

(51) Int. Cl.
*H05B 3/40* (2006.01)
*A24F 40/20* (2020.01)
(Continued)

(52) U.S. Cl.
CPC ............... *H05B 3/40* (2013.01); *A24F 40/20* (2020.01); *H05B 3/12* (2013.01); *A24F 40/465* (2020.01)

(58) Field of Classification Search
CPC ... H05B 3/12; H05B 3/40; A24F 40/20; A24F 40/46
See application file for complete search history.

(56) References Cited

U.S. PATENT DOCUMENTS

2017/0055580 A1 3/2017 Blandino et al.
2020/0163385 A1* 5/2020 Courbat ................ A24F 40/465
2020/0236998 A1* 7/2020 Batista .................... A24F 40/57

FOREIGN PATENT DOCUMENTS

CN 109123805 A 1/2019
EP 2260733 A1 12/2010
(Continued)

OTHER PUBLICATIONS

International Search Report and Written Opinion for Application No. PCT/EP2020/068384, mailed on Sep. 29, 2020, 10 pages.
(Continued)

*Primary Examiner* — Thien S Tran
(74) *Attorney, Agent, or Firm* — MERCHANT & GOULD P.C.

(57) ABSTRACT

Disclosed is a heating element (1) for a non-combustible aerosol provision device (100), the heating element (1) having a rod (10), wherein the rod (10) has a longitudinal axis, a distal end portion (13), and first and second tapered portions (11, 12) at respective longitudinal positions along the longitudinal axis. The second tapered portion (12) extends from the distal end portion (13) towards the first tapered portion (11), and a cross-sectional area of the rod (10) increases with distance from the distal end portion (130) in each of the first and second tapered portions (11, 12). A first angle between the longitudinal axis and an outer tapered surface (11*s*) of the first tapered portion (11) is smaller than a second angle between the longitudinal axis and an outer tapered surface (12*s*) of the second tapered portion (12).

8 Claims, 2 Drawing Sheets

(51) Int. Cl.
*A24F 40/465* (2020.01)
*H05B 3/12* (2006.01)

(56) References Cited

FOREIGN PATENT DOCUMENTS

| | | | | | |
|---|---|---|---|---|---|
| EP | 2394520 | A1 | | 12/2011 | |
| JP | 2010178730 | A | | 8/2010 | |
| JP | 2018536398 | A | | 12/2018 | |
| KR | 20190016907 | A | * | 2/2019 | ............... H05B 3/16 |
| KR | 20200035027 | A | * | 4/2020 | ........... A24F 40/465 |
| RU | 2019106680 | A | | 4/2019 | |
| WO | 2011079933 | A1 | | 7/2011 | |
| WO | 2016156103 | A1 | | 10/2016 | |
| WO | WO-2018002085 | A1 | | 1/2018 | |
| WO | 2018110834 | A2 | | 6/2018 | |
| WO | WO-2018190606 | A1 | | 10/2018 | |
| WO | WO-2019030168 | A1 | * | 2/2019 | ........... A24F 40/465 |
| WO | WO-2019030366 | A1 | | 2/2019 | |

OTHER PUBLICATIONS

"Decision of Refusal received for Japanese Patent Application No. 2021-574964, mailed on Aug. 8, 2023", 8 pages (4 pages of English Translation and 4 pages of Official Copy).

"International Preliminary Report on Patentability received for PCT Patent Application No. PCT/EP2020/068384, mailed on Jan. 20, 2022", 8 pages.

"Reason for Rejection received for Japanese Patent Application No. 2021-574964, mailed on Mar. 22, 2023", 8 pages (4 pages of English Translation and 4 pages of Official Copy).

"Search Report received for Russian Patent Application No. 2021138170, mailed on Jun. 27, 2022", 2 Pages.

Lasseter , et al., "Special Report: Scientists Describe Problems in Philip Morris e-cigarette Experiments", Available Online at <https://www.reuters.com/investigates/special-report/tobacco-iqos-science/>, Dec. 20, 2017, pp. 1-13.

* cited by examiner

HEATING ELEMENT

PRIORITY CLAIM

The present application is a National Phase entry of PCT Application No. PCT/EP2020/068384, filed Jun. 30, 2020, which claims priority from GB Patent Application No. 1909772.4, filed Jul. 8, 2019, each of which is hereby fully incorporated herein by reference.

TECHNICAL FIELD

The present disclosure relates to heating elements for non-combustible aerosol provision devices, to non-combustible aerosol provision devices, and to non-combustible aerosol provision systems. The non-combustible aerosol provision devices may be tobacco heating products.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides a heating element for a non-combustible aerosol provision device; wherein the heating element comprises a rod, wherein the rod has a longitudinal axis, a distal end portion, and first and second tapered portions at respective longitudinal positions along the longitudinal axis; wherein the second tapered portion extends from the distal end portion towards the first tapered portion, and wherein a cross-sectional area of the rod increases with distance from the distal end portion in each of the first and second tapered portions; and wherein a first angle between the longitudinal axis and an outer tapered surface of the first tapered portion is smaller than a second angle between the longitudinal axis and an outer tapered surface of the second tapered portion.

In an exemplary embodiment, the first angle is between 0.5 degrees and 25 degrees. In an exemplary embodiment, the first angle is between 5 degrees and 20 degrees. In an exemplary embodiment, the first angle is between 10 degrees and 15 degrees. In an exemplary embodiment, the first angle is selected to facilitate removal of the rod from a tobacco industry product in use.

In an exemplary embodiment, the first tapered portion extends over a majority of a length of the rod. In an exemplary embodiment, the second tapered portion is conical. In an exemplary embodiment, the second tapered portion is non-conical. In an exemplary embodiment, the rod is a flat strip.

A second aspect of the present disclosure provides a heating element for a non-combustible aerosol provision device, wherein the heating element comprises a rod, wherein the rod has a longitudinal axis and an outer tapered surface, and wherein, over at least a majority of a length of the rod, an angle between the longitudinal axis and the outer tapered surface is between 0.5 degrees and 25 degrees.

In an exemplary embodiment, the angle is between 5 degrees and 20 degrees. In an exemplary embodiment, the angle is between 10 degrees and 15 degrees. In an exemplary embodiment, the angle is selected to facilitate removal of the rod from a tobacco industry product in use.

In an exemplary embodiment, the rod comprises a distal end portion, and first and second tapered portions at respective longitudinal positions along the longitudinal axis; wherein the second tapered portion extends from the distal end portion towards the first tapered portion, and wherein a cross-sectional area of the rod increases with distance from the distal end portion in each of the first and second tapered portions; wherein the angle is a first angle between the longitudinal axis and an outer tapered surface of the first tapered portion; and wherein the first angle is smaller than a second angle between the longitudinal axis and an outer tapered surface of the second tapered portion.

In an exemplary embodiment, the second angle is 45 degrees or less. In an exemplary embodiment, the second angle is between 10 degrees and 40 degrees. In an exemplary embodiment, the second angle is between 15 degrees and 35 degrees. In an exemplary embodiment, the second angle is selected to facilitate insertion of the rod into a tobacco industry product in use.

In an exemplary embodiment, the second tapered portion extends from the distal end portion to the first tapered portion. In an exemplary embodiment, the first tapered portion is longer than the second tapered portion in the direction of the longitudinal axis.

In an exemplary embodiment, the rod comprises heating material that is heatable by penetration with a varying magnetic field. In an exemplary embodiment, the rod consists or consists essentially of heating material that is heatable by penetration with a varying magnetic field.

In an exemplary embodiment, the heating material comprises one or more materials selected from the group consisting of: an electrically-conductive material, a magnetic material, and a magnetic electrically-conductive material. In an exemplary embodiment, the heating material comprises a metal or a metal alloy. In an exemplary embodiment, the heating material comprises one or more materials selected from the group consisting of: aluminum, gold, iron, nickel, cobalt, conductive carbon, graphite, steel, plain-carbon steel, mild steel, stainless steel, ferritic stainless steel, molybdenum, silicon carbide, copper, and bronze.

In an exemplary embodiment, the rod is electrically conductive. In an exemplary embodiment, orthogonal to the longitudinal axis, the rod has a cross-sectional shape selected from a group consisting of: circular, elliptical, rectangular, square and triangular. In an exemplary embodiment, the rod is substantially non-compressible in use.

A third aspect of the present disclosure provides a non-combustible aerosol provision device, comprising: a heating chamber for receiving at least a portion of a tobacco industry product comprising aerosolizable material; a heating element comprising a rod that protrudes into the heating chamber and is coincident with, or parallel to, an axis of the heating chamber; and a heating device for causing heating of the rod thereby to cause heating of the aerosolizable material when the tobacco industry product is in the heating chamber; wherein the rod has a distal end portion, and first and second tapered portions at respective axial positions along the axis; wherein the second tapered portion extends from the distal end portion towards the first tapered portion, and wherein a cross-sectional area of the rod increases with distance from the distal end portion in each of the first and second tapered portions; and wherein a first angle between the axis and an outer tapered surface of the first tapered portion is smaller than a second angle between the axis and an outer tapered surface of the second tapered portion.

In an exemplary embodiment, the axis is a central axis of the heating chamber. In an exemplary embodiment, the heating chamber is elongate and the axis is a longitudinal axis of the heating chamber.

In an exemplary embodiment, the first angle is between 0.5 and 25 degrees. In an exemplary embodiment, the first angle is between 5 degrees and 20 degrees. In an exemplary embodiment, the first angle is between 10 degrees and 15 degrees. In an exemplary embodiment, the first angle is selected to facilitate removal of the rod from a tobacco industry product in use.

In an exemplary embodiment, the second angle is 45 degrees or less. In an exemplary embodiment, the second angle is between 10 degrees and 40 degrees. In an exemplary embodiment, the second angle is between 15 degrees and 35 degrees. In an exemplary embodiment, the second angle is selected to facilitate insertion of the rod into a tobacco industry product in use.

In an exemplary embodiment, the second tapered portion extends from the distal end portion to the first tapered portion. In an exemplary embodiment, the first tapered portion is longer than the second tapered portion in the direction of the axis.

In an exemplary embodiment, the rod comprises heating material that is heatable by penetration with a varying magnetic field. In an exemplary embodiment, the rod consists or consists essentially of heating material that is heatable by penetration with a varying magnetic field.

In an exemplary embodiment, the heating device comprises a magnetic field generator for generating a varying magnetic field for penetrating the rod.

In an exemplary embodiment, the heating material comprises one or more materials selected from the group consisting of: an electrically-conductive material, a magnetic material, and a magnetic electrically-conductive material. In an exemplary embodiment, the heating material comprises a metal or a metal alloy. In an exemplary embodiment, the heating material comprises one or more materials selected from the group consisting of: aluminum gold, iron, nickel, cobalt, conductive carbon, graphite, steel, plain-carbon steel, mild steel, stainless steel, ferritic stainless steel, molybdenum, silicon carbide, copper, and bronze.

In an exemplary embodiment, the rod is electrically conductive. In an exemplary embodiment, orthogonal to the axis, the rod has a cross-sectional shape selected from a group consisting of: circular, elliptical, rectangular, square and triangular. In an exemplary embodiment, the rod is substantially non-compressible in use. In an exemplary embodiment, the heating element comprises the heating element according to the first or the second aspect of the present disclosure.

A fourth aspect of the present disclosure provides a non-combustible aerosol provision system, comprising: the non-combustible aerosol provision device according to the third aspect of the present disclosure; and a tobacco industry product comprising aerosolizable material, wherein the tobacco industry product is insertable into the heating chamber of the non-combustible aerosol provision device so that the second tapered portion and at least part of the first tapered portion penetrate the tobacco industry product.

In an exemplary embodiment, the tobacco industry product is insertable into the heating chamber of the non-combustible aerosol provision device so that the second tapered portion and at least part of the first tapered portion penetrate the aerosolizable material. In an exemplary embodiment of the non-combustible aerosol provision device or of the non-combustible aerosol provision system, the aerosolizable material is a non-liquid material. In an exemplary embodiment of the non-combustible aerosol provision device or of the non-combustible aerosol provision system, the aerosolizable material comprises tobacco. In an exemplary embodiment of the non-combustible aerosol provision device or of the non-combustible aerosol provision system, the aerosolizable material comprises reconstituted aerosolizable material, such as reconstituted tobacco A fifth aspect of the present disclosure provides a heating element for a non-combustible aerosol provision device, wherein the heating element is for use in penetrating and heating aerosolizable material of a tobacco industry product, wherein the heating element has an outer surface that is configured to contact the aerosolizable material in use, and wherein the outer surface has a surface roughness selected so as to reduce a friction force applied by the heating element to the aerosolizable material on removal of the heating element from the aerosolizable material, thereby to reduce the extent to which the aerosolizable material is dragged by the heating element while the heating element is removed from the aerosolizable material.

In an exemplary embodiment, the outer surface is polished, such as electro-polished. In an exemplary embodiment, the outer surface is coated with a low-friction material. Example low-friction materials will be well known to the skilled person.

BRIEF DESCRIPTION OF THE DRAWINGS

Embodiments of the disclosure will now be described, by way of example only, with reference to the accompanying drawings, in which.

DETAILED DESCRIPTION

Figure 1:
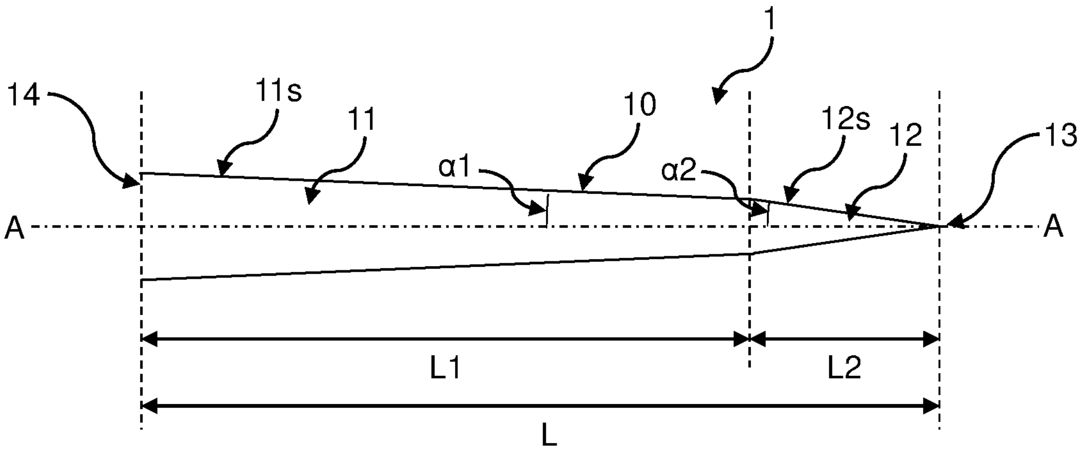
FIG. 1 shows a schematic side view of an example of a heating element for a non-combustible aerosol provision device.

As used herein, the term "aerosolizable material" includes materials that provide volatilized components upon heating, typically in the form of vapor or an aerosol. "Aerosolizable material" may be a non-tobacco-containing material or a tobacco-containing material. "Aerosolizable material" may, for example, include one or more of tobacco per se, tobacco derivatives, expanded tobacco, reconstituted tobacco, tobacco extract, homogenized tobacco or tobacco substitutes. The aerosolizable material can be in the form of ground tobacco, cut rag tobacco, extruded tobacco, reconstituted tobacco, reconstituted aerosolizable material, liquid, gel, a solid, an amorphous solid, gelled sheet, powder, or agglomerates, or the like. "Aerosolizable material" also may include other, non-tobacco, products, which, depending on the product, may or may not contain nicotine. “Aerosolizable material” may comprise one or more humectants, such as glycerol or propylene glycol.

In some examples, the aerosolizable material is in the form of an “amorphous solid”. Any material referred to herein as an “amorphous solid” may alternatively be referred to as a “monolithic solid” (e.g., non-fibrous), or as a “dried gel”. It some cases, it may be referred to as a “thick film”. In some examples, the amorphous solid may consist essentially of, or consist of, a gelling agent, an aerosol generating agent, a tobacco material and/or a nicotine source, water, and optionally a flavor.

In some examples, the gel or amorphous solid takes the form of a foam, such as an open celled foam.

As used herein, the term “heating material” or “heater material” refers to material that is heatable by penetration with a varying magnetic field.

Induction heating is a process in which an electrically-conductive object is heated by penetrating the object with a varying magnetic field. The process is described by Faraday’s law of induction and Ohm’s law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed electrical circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule and magnetic hysteresis heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, design freedom and control over the heating profile may be greater, and cost may be lower.

Referring to FIG. 1 there is shown a schematic side view of a heating element according to an example. The heating element 1 is for a non-combustible aerosol provision device, such as the device 100 described below with reference to FIG. 5.

The heating element 1 comprises a rod 10. The rod 10 may in the form of a pin, bar, or flat strip, for example. The rod 10 has a longitudinal axis A-A. Orthogonal to the longitudinal axis A-A, the rod 10 may have a cross-sectional shape selected from a group consisting of: circular, elliptical, rectangular, square, and triangular. Other cross-sectional shapes may be used in other examples, such as star-shaped or hexagonal, for example. In this example, the rod 10 is substantially non-compressible in use.

The rod 10 has a first tapered portion 11, a second tapered portion 12 and a distal end portion 13. The distal end portion 13 comprises a free end of the rod 10. In use, the free end is the end of the rod 10 that first enters a tobacco industry product comprising aerosolizable material for subsequent heating of the aerosolizable material, as will be described below. The distal end portion 13 is distal from a proximal end portion 14 of the rod 10. The proximal end portion 14 may be the end portion of the rod 10 at which the rod 10 is attachable or mountable (or attached or mounted) to the rest of the non-combustible aerosol provision device. In this example, the proximal end portion 14 is one end of the first tapered portion 11. In other examples, the rod 10 may comprise one or more further portions (not shown) between the first tapered portion 11 and the proximal end portion 14, such as a non-tapered portion.

The first and second tapered portions 11, 12 are at respective longitudinal positions along the longitudinal axis A-A. The second tapered portion 12 is located between the first tapered portion 11 and the distal end portion 13. The second tapered portion 12 extends from the distal end portion 13 towards the first tapered portion 11. In this example, the second tapered portion 12 extends from the distal end portion 13 to the first tapered portion 11, so that the second tapered portion 12 joins the distal end portion 13 to the first tapered portion 11. In other examples, the rod 10 may comprise one or more further portions (not shown) between the distal end portion 13 and the first tapered portion 11. The first and second tapered portions 11, 12 are configured and arranged so that a cross-sectional area of the rod 10 increases with distance from the distal end portion 13 in each of the first and second tapered portions 11, 12.

The rod 10 has a length L in the direction of the longitudinal axis A-A. In some examples, the length L is between 5 mm and 100 mm, such as between 7 mm and 70 mm, or between 10 mm and 50 mm, or between 11 mm and 40 mm. The length L of the rod 10 may lie in other than one of these ranges, in other examples. In some embodiments, the length L of the rod 10 is greater than a dimension, or any dimension, of the rod 10 measured in a direction orthogonal to the length L of the rod 10.

The first tapered portion 11 has a length L1 in the direction of the longitudinal axis A-A. The second tapered portion 12 has a length L2 in the direction of the longitudinal axis A-A. In this example, the length L of the rod 10 is a sum of the lengths L1, L2 of the first and second tapered portions 11, 12. In examples where the rod 10 comprises one or more further portions (not shown) between the first tapered portion 11 and the proximal end portion 14, the length L of the rod 10 is greater than a sum of the lengths L1, L2 of the first and second tapered portions 11, 12.

In some examples, the first and second tapered portions 11, 12 are of equal, or substantially equal, length in the direction of the longitudinal axis A-A. In some examples, the length L1 of the first tapered portion 11 is less than the length L2 of the second tapered portion 12. However, in this example, the length L1 of the first tapered portion 11 is greater than the length L2 of the second tapered portion 12. Moreover, in this example, the first tapered portion 11 extends over a majority of the length L of the rod 10.

The first tapered portion 11 has an outer tapered surface 11*s*, and a first angle $\alpha$1 is defined between the longitudinal axis A-A and the outer tapered surface 11*s* of the first tapered portion 11. Similarly, the second tapered portion 12 has an outer tapered surface 12*s*, and a second angle $\alpha$2 is defined between the longitudinal axis A-A and the outer tapered surface 12*s* of the second tapered portion 12.

The second angle $\alpha$2 is selected so as to facilitate entry of the rod 10 into a tobacco industry product comprising aerosolizable material, in use. The distal end portion 13 and the second tapered portion 12 may effectively pierce the tobacco industry product, such as the aerosolizable material. For example, the distal end portion 13 and the second tapered portion 12 may have to displace or part portions of the aerosolizable material during such insertion. The second angle $\alpha$2 may be selected so as to provide an acceptable compromise between enabling the distal end portion 13 and the second tapered portion 12 to be sufficiently "sharp" to ease such entry into the tobacco industry product, and ensuring that the second tapered portion 12 has sufficient robustness to withstand forces applied to it in use and sufficient thermal mass to enable it to be a useful heating element.

In this example, the second angle $\alpha$2 is about 15 degrees. However, in other examples, the second angle $\alpha$2 may be any angle of 45 degrees or less, such as between about 10 degrees and about 40 degrees or between about 15 degrees and about 35 degrees. The second angle $\alpha$2 may be constant along the full length L2 of the second tapered portion 12, or it may vary along the length L2 of the second tapered portion 12. However, in examples where the second angle $\alpha$2 varies along the length L2 of the second tapered portion 12, preferably no part of the outer tapered surface 12*s* of the second tapered portion 12 defines an angle to the longitudinal axis A-A that is greater than 45 degrees.

In some known non-combustible aerosol provision devices, it has been found that bits of heated aerosolizable material may either catch on, or otherwise adhere to, the surface of a heating element in a heating chamber of the device. As the aerosolizable material is removed from the device, this can result in bits of the consumed aerosolizable material breaking away and subsequently depositing in the heating chamber. This is undesirable from a hygiene point of view, as the heating chamber requires regular cleaning, and also from a sensory point of view, as the spent aerosolizable material can add off-tastes to the aerosol generated by fresh aerosolizable.

Therefore, the first angle $\alpha$1 is selected so as to facilitate release of the rod 10 from the tobacco industry product. More specifically, the first angle $\alpha$1 is selected so as to reduce the extent to which aerosolizable material is dragged along the heating element while the heating element is removed. The first angle $\alpha$1 may be selected so as to provide an acceptable compromise between facilitating withdrawal of the rod 10 from the tobacco industry product, and ensuring that the first tapered portion 11 has sufficient robustness to withstand forces applied to it in use and sufficient thermal mass to enable it to be a useful heating element.

In this example, the first angle $\alpha$1 is about 10 degrees. However, in other examples, the first angle $\alpha$1 may be any angle between about 0.5 degrees and about 25 degrees, such as between about 5 degrees and about 20 degrees or between about 10 degrees and about 15 degrees. The first angle $\alpha$1 may be constant along the full length L1 of the first tapered portion 11, or it may vary along the length L1 of the first tapered portion 11. However, in examples where the first angle $\alpha$1 varies along the length L1 of the first tapered portion 11, preferably no part of the outer tapered surface 11*s* of the first tapered portion 11 defines an angle to the longitudinal axis A-A of outside the range of about 0.5 degrees to about 25 degrees.

In this example, the first angle $\alpha$1 between the longitudinal axis A-A and the outer tapered surface 11*s* of the first tapered portion 11 is smaller than the second angle $\alpha$2 between the longitudinal axis A-A and the outer tapered surface 12*s* of the second tapered portion 12. Moreover, in this example, there is a point change or step change between the first and second angles $\alpha$1, $\alpha$2 where the first and second tapered portions 11, 12. In other examples, the first tapered portion 11 may transition into the second tapered portion 12 smoothly and without there being a distinct point change or step change. In some examples, the first and second angles $\alpha$1, $\alpha$2 may be equal, or substantially equal. In examples where the first and second angles $\alpha$1, $\alpha$2 are equal, or substantially equal, the first and second angles $\alpha$1, $\alpha$2 may be any angle between about 0.5 degrees and about 25 degrees, such as between about 5 degrees and about 20 degrees or between about 10 degrees and about 15 degrees.

Figure 5:
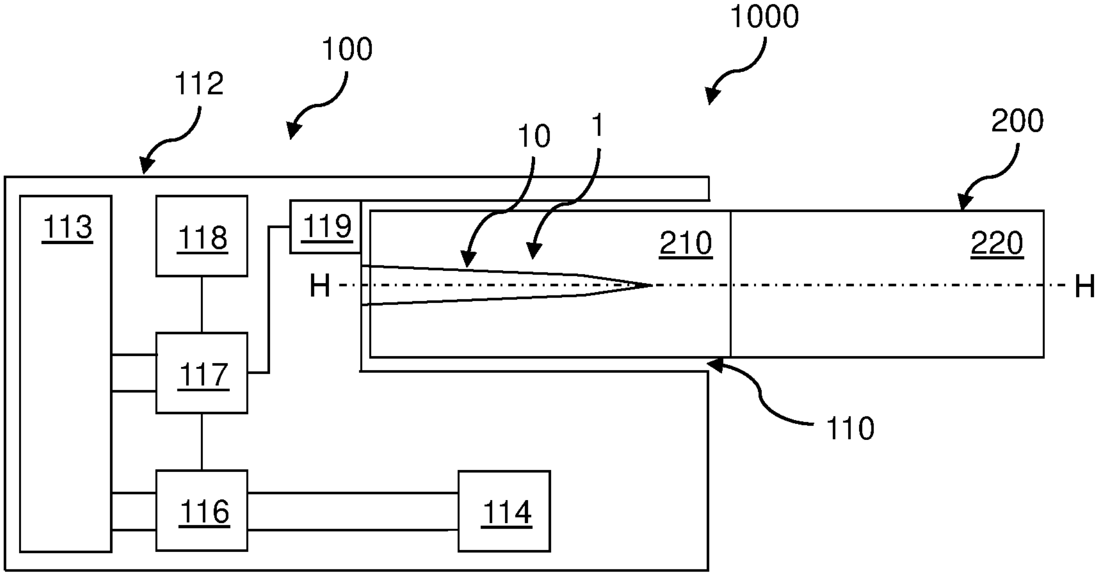
FIG. 5 shows a schematic cross-sectional side view of an example of a non-combustible aerosol provision system comprising a non-combustible aerosol provision device and a tobacco industry product comprising aerosolizable material.

The dimensions of the heating element 1, including the first and second angles $\alpha$1, $\alpha$2 and the lengths L1, L2 of the first and second tapered portions 11, 12, are selected so that the heating element 1 is compatible with the tobacco industry product 200, as shown by example in FIG. 5, into which the heating element 1 is to be inserted in use. If the angles $\alpha$1, $\alpha$2 and the lengths L1, L2 are too small, the heating element 1 may not effectively heat the aerosolizable material 201 of the tobacco industry product 200. On the other hand, if the angles $\alpha$1, $\alpha$2 and the lengths L1, L2 are too large, then the heating element 1 may not fit within the aerosolizable material 201, may displace too much of the aerosolizable material 201 on insertion, or may cause the heating element 1 to be so close to a wrapper (if present) wrapped around the aerosolizable material 201 that the heating element 1 could char or otherwise damage the wrapper in use. By way of an example only, the proximal end portion 14 of the rod 10 may have a width orthogonal to the longitudinal axis A-A of less than 8 mm, or less than 7 mm, or less than 6 mm.

Figure 2:
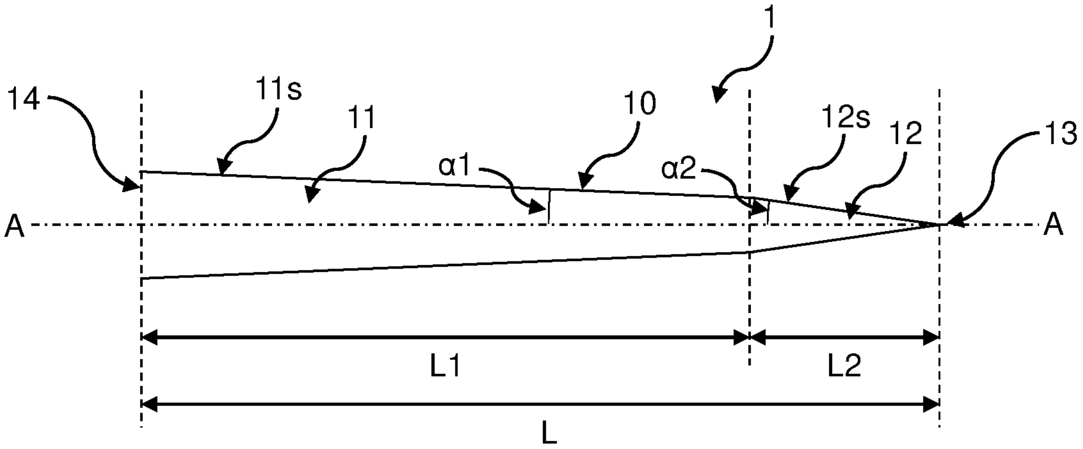
FIG. 2 shows a schematic top view of the heating element of FIG. 1.

FIG. 1 shows a schematic side view of the example heating element 1. A schematic top view of the heating element 1 is shown in FIG. 2. The view in FIG. 2 is thus in a direction orthogonal to that of the view of FIG. 1. As will be seen in FIG. 2, the rod 10 has the same cross-sectional shape in both directions orthogonal to the longitudinal axis A-A. The rod 10, therefore, has rotational symmetry about the longitudinal axis A-A. Indeed, in this example, the second tapered portion 12 is conical and the first tapered portion 11 is frustoconical. The rod 10 is thus infinitely rotationally symmetrical, or has an infinite order of rotational symmetry. In other examples, the rod 10 may have a non-infinite order of rotational symmetry, such as order two, three, four, six or eight.

Figure 3:
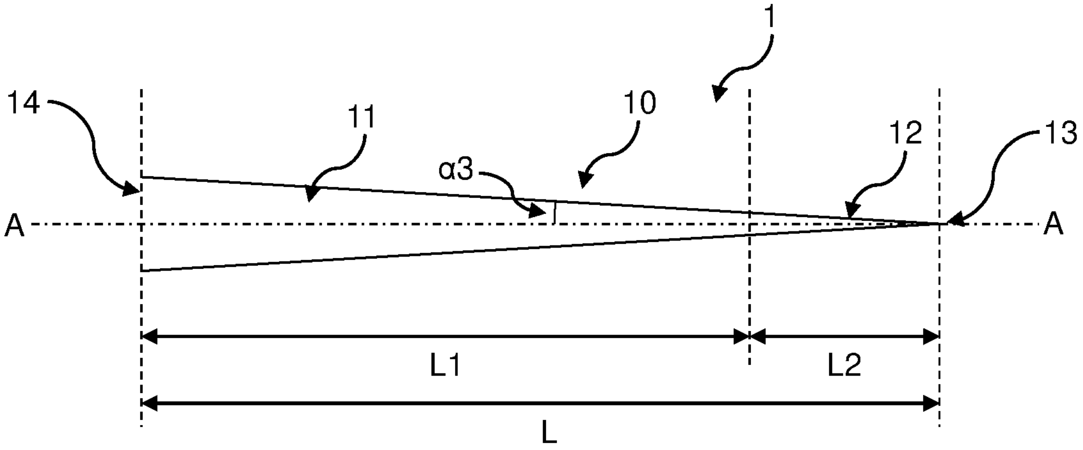
FIG. 3 shows a schematic top view of another example of a heating element for a non-combustible aerosol provision device.

In a variation to the example shown in FIGS. 1 and 2, and as shown in FIG. 3, the rod 10 tapers at a constant, or substantially constant, angle $\alpha 3$ over the combined full lengths L1, L2 of the first and second tapered portions 11, 12 when viewed from the top. When viewed from the side, the heating element 1 of FIG. 3 has the same dimensions as shown in FIG. 1. The angle $\alpha 3$ may be any angle between about 0.5 degrees and about 25 degrees, such as between about 5 degrees and about 20 degrees or between about 10 degrees and about 15 degrees.

Figure 4:
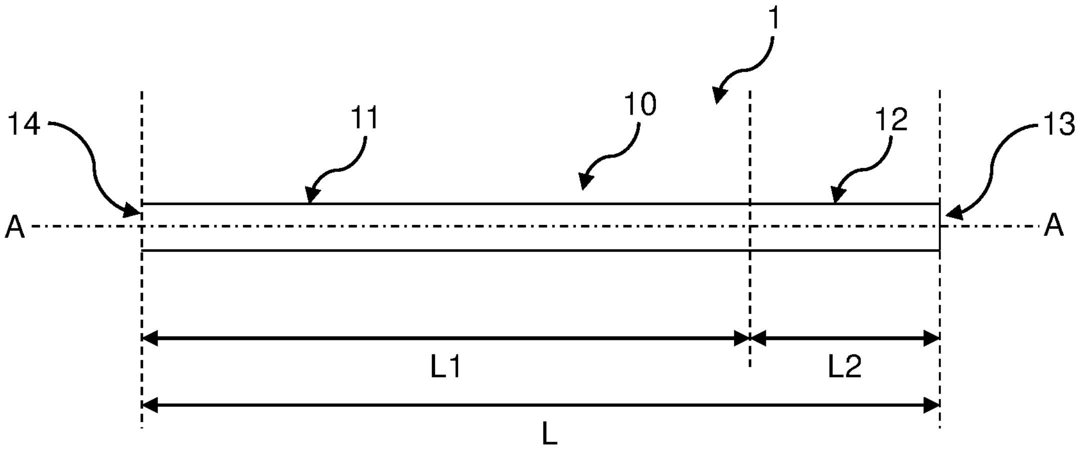
FIG. 4 shows a schematic top view of a further example of a heating element for a non-combustible aerosol provision device.

In another variation to the example shown in FIGS. 1 and 2, and as shown in FIG. 4, the rod 10 does not taper in the first and second tapered portions 11, 12 when viewed from the top. That is, the cross-sectional area of the rod 10 is constant, or substantially constant, over the combined full lengths L1, L2 of the first and second tapered portions 11, 12. When viewed from the side, the heating element 1 of FIG. 4 has the same dimensions as shown in FIG. 1.

In other examples, and when viewed from the top, the rod 10 may have a different shape. For example, the rod 10 may taper over the length L2 of the second tapered portion 12, and not taper over the length L1 of the first tapered portion 10 when viewed from the top. When viewed from the side, the rod still has the same dimensions as shown in FIG. 1.

The rod 10 of any one of the examples described herein may comprise heating material that is heatable by penetration with a varying magnetic field. For example, the rod 10 may consist of, or consist essentially of, heating material that is heatable by penetration with a varying magnetic field. The rod 10 may comprise, or consist or consist essentially of, two or more different heating materials that are each heatable by penetration with a varying magnetic field. In some examples, the rod 10 may comprise a support and heating material on or in the support. The support may be free from, or substantially free from, heating material that is heatable by penetration with a varying magnetic field. For example, the support may comprise a ceramic material, glass, or a polymer such as polyether ether ketone (PEEK). The heating material may be provided on the support in the form of one or more tracks, that may each follow a tortuous and/or spiral path. The rod 10, or at least a part thereof, may thus be electrically conductive.

In some examples, the heating material of the rod 10 is aluminum. However, in other examples, the heating material may comprise one or more materials selected from the group consisting of: an electrically-conductive material, a magnetic material, and a magnetic electrically-conductive material. In some examples, the heating material may comprise a metal or a metal alloy. In some examples, the heating material may comprise one or more materials selected from the group consisting of: aluminum, gold, iron, nickel, cobalt, conductive carbon, graphite, steel, plain-carbon steel, mild steel, stainless steel, ferritic stainless steel, molybdenum, silicon carbide, copper, and bronze. Other heating material(s) may be used in other examples.

In some examples, such as those in which the heating material comprises iron, such as steel (e.g. mild steel or stainless steel) or aluminum, the heating material may be coated to help avoid corrosion or oxidation of the heating material in use. Such coating may, for example, comprise nickel plating, gold plating, or a coating of a ceramic or an inert polymer.

In some examples, the rod 10 is instead, or additionally, heatable resistively by way of connecting a source of electrical energy to the rod 10 so that an electrical current may be passed through the rod 10.

Referring to FIG. 5, there is shown a schematic cross-sectional side view of an example of a non-combustible aerosol provision system.

The system 1000 comprises a non-combustible aerosol provision device 100 and a tobacco industry product 200 comprising aerosolizable material 210. In this example, the aerosol provision device 100 is a tobacco heating product (also known in the art as a tobacco heating device or a heat-not-burn device).

The aerosol provision device 100 comprises a heating chamber 110 for receiving the tobacco industry product 200, and a heating device 112 for causing heating of the aerosolizable material 210 when the tobacco industry product 200 is in the heating chamber 110.

The aerosol provision device 100 may define at least one air inlet (not shown) that fluidly connects the heating chamber 110 with the exterior of the aerosol provision device 100. A user may be able to inhale the volatilized component(s) of the aerosolizable material by drawing the volatilized component(s) from the heating chamber 110 via the tobacco industry product 200. As the volatilized component(s) are removed from the heating chamber 110 and the tobacco industry product 200, air may be drawn into the heating chamber 110 via the air inlet(s) of the aerosol provision device 100.

In this example, the heating chamber 110 extends along an axis H-H and is sized and shaped to accommodate only a portion of the tobacco industry product 200. In this example, the axis H-H is a central axis of the heating chamber 110. Moreover, in this example, the heating chamber 110 is elongate and so the axis H-H is a longitudinal axis H-H of the heating chamber 110. In other examples, the heating chamber 110 may be elongate or non-elongate and dimensioned to receive the whole of the tobacco industry product 200.

The aerosol provision device 100 has a heating element 1 that comprises a rod 10. The rod 10 protrudes into the heating chamber 110 and is coincident with the axis H-H of the heating chamber 110. In other examples, the rod 10 may be parallel to the axis H-H of the heating chamber 110 rather than coincident with it.

The heating device 112 is for causing heating of the rod 10, thereby to cause heating of the aerosolizable material 210 when the tobacco industry product 200 is in the heating chamber 110. In this example, the heating element 1 is the heating element 1 shown in FIGS. 1 and 2 and described above. However, in other examples, the heating element 1 of the aerosol provision device 100 may be any of the variants of the heating element 1 shown in FIGS. 1 and 2 described herein. As such in this example, and with reference again to FIG. 1, the rod 10 of the heating element 1 has a distal end portion 13, and first and second tapered portions 11, 12 at respective axial positions along the axis H-H. The second tapered portion 12 extends from the distal end portion 13 towards the first tapered portion 11, and a cross-sectional area of the rod 10 increases with distance from the distal end portion 13 in each of the first and second tapered portions 11, 12. The first angle $\alpha 1$ between the axis H-H and the outer tapered surface 11*s* of the first tapered portion 11 is smaller than the second angle $\alpha 2$ between the axis H-H and the outer tapered surface is of the second tapered portion 12.

In the example of FIG. 5, the heating device 112 comprises a magnetic field generator for generating a varying magnetic field for penetrating the rod 10. In this example, the magnetic field generator 112 comprises an electrical power source 113, a coil 114, a device 116 for passing a varying electrical current, such as an alternating current, through the coil 114, a controller 117, and a user interface 118 for user-operation of the controller 117.

The electrical power source 113 of this example is a rechargeable battery. In other examples, the electrical power source 113 may be other than a rechargeable battery, such as a non-rechargeable battery, a capacitor, a battery-capacitor hybrid, or a connection to a mains electricity supply.

The coil 114 may take any suitable form. In some examples, the coil 114 is a helical coil of electrically-conductive material, such as copper. In some examples, the coil 114 encircles at least part of the heating element 1. In some examples, the coil 114 encircles at least part of the heating chamber 110. In some examples, the coil 114 extends along a longitudinal axis that is substantially aligned with a longitudinal axis of the heating chamber 110. The aligned axes may be coincident. Alternatively, the aligned axes may be parallel or oblique to each other. In some examples, the coil 114 is a planar coil. That is, the coil 114 may comprise a spiral of electrically-conductive material, such as copper, that lies in a plane. The plane may be a flat plane or a curved plane. In some examples when the plane is a curved plane, the plane may be curved about the axis A-A of the rod 10 and/or the axis H-H of the heating chamber 110.

In this example, the device 116 for passing a varying current through the coil 114 is electrically connected between the electrical power source 113 and the coil 114. In this example, the controller 117 also is electrically connected to the electrical power source 113, and is communicatively connected to the device 116 to control the device 116. More specifically, in this example, the controller 117 is for controlling the device 116, so as to control the supply of electrical power from the electrical power source 113 to the coil 114. In this example, the controller 117 comprises an integrated circuit (IC), such as an IC on a printed circuit board (PCB). In other examples, the controller 117 may take a different form. In some examples, the aerosol provision device 100 may have a single electrical or electronic component comprising the device 116 and the controller 117. The controller 117 is operated in this example by user-operation of the user interface 118. The user interface 118 may comprise a push-button, a toggle switch, a dial, a touchscreen, or the like. In other examples, the user interface 118 may be remote and connected to the rest of the aerosol provision device 100 wirelessly, such as via. Bluetooth.

In this example, operation of the user interface 118 by a user causes the controller 117 to cause the device 116 to cause an alternating electrical current to pass through the coil 114. This causes the coil 114 to generate an alternating magnetic field. The coil 114 and the rod 10 are suitably relatively positioned so that the varying magnetic field produced by the coil 114 penetrates the rod 10. When the heating material of the rod 10 is electrically-conductive, this penetration causes the generation of one or more eddy currents in the heating material. The flow of eddy currents in the heating material against the electrical resistance of the heating material causes the heating material to be heated by Joule heating. When the heating material of the rod 10 is a magnetic material, the orientation of magnetic dipoles in the heating material changes with the changing applied magnetic field, which causes heat to be generated in the heating material.

The aerosol provision device 100 of this example comprises a temperature sensor 119 for sensing a temperature of the heating chamber 110. The temperature sensor 119 is communicatively connected to the controller 117, so that the controller 117 is able to monitor the temperature of the heating chamber 110. On the basis of one or more signals received from the temperature sensor 119, the controller 117 may cause the device 112 to adjust a characteristic of the varying or alternating electrical current passed through the coil 114 as necessary, in order to ensure that the temperature of the heating chamber 110 remains within a predetermined temperature range. The characteristic may be, for example, amplitude or frequency or duty cycle. Within the predetermined temperature range, in use the aerosolizable material 210 within the tobacco industry product located in the heating chamber 110 is heated sufficiently to volatilize at least one component of the aerosolizable material 210 without combusting the aerosolizable material 210. Accordingly, the controller, and the aerosol provision device 100 as a whole, is arranged to heat the aerosolizable material 210 to volatilize the at least one component of the aerosolizable material 210 without combusting the aerosolizable material 210. The temperature range may be between about 50° C. and about 350° C., such as between about 100° C. and about 300° C., or between about 150° C. and about 280° C. In other examples, the temperature range may be other than one of these ranges. In some examples, the upper limit of the temperature range could be greater than 350° C. In some examples, the temperature sensor 119 may be omitted.

In some examples, the heating element 1 is instead a resistive heater that is heated by passing electricity through the resistive heater, and the controller 117 is configured to control the passage of electricity through the resistive heater. In such examples, the coil 114 and the device 116 for passing a varying electrical current through the coil 114 may be omitted.

The tobacco industry product 200 is insertable into the heating chamber 110 of the non-combustible aerosol provision device 100 so that the second tapered portion 12 and at least part of the first tapered portion 11 penetrate the tobacco industry product 200. More specifically, in this example, the tobacco industry product 200 is insertable into the heating chamber 110 so that the second tapered portion 12 and at least part of the first tapered portion 11 penetrate the aerosolizable material 210 of the tobacco industry product 200. As noted above, the second angle $\alpha$2 defined between the longitudinal axis A-A of the rod 10 and the outer tapered surface 12*s* of the second tapered portion 12 facilitates such penetration of the tobacco industry product 200 by the rod 10.

In some examples, the aerosolizable material 210 is a non-liquid material. In some examples, the aerosolizable material 210 is a gel. In some examples, the aerosolizable material 210 comprises tobacco. However, in other examples, the aerosolizable material 210 may consist of tobacco, may consist substantially entirely of tobacco, may comprise tobacco and aerosolizable material other than tobacco, may comprise aerosolizable material other than tobacco, or may be free from tobacco. In some examples, the aerosolizable material may comprise a vapor or aerosol forming agent or a humectant, such as glycerol, propylene glycol, triacetin, or diethylene glycol. In some examples, the aerosolizable material 210 comprises reconstituted aerosolizable material, such as reconstituted tobacco.

In some examples, the aerosolizable material 210 is substantially cylindrical with a substantially circular cross section and a longitudinal axis. In other embodiments, the aerosolizable material 210 may have a different cross section or not be elongate.

The aerosolizable material 210 of the tobacco industry product 200 may, for example, have an axial length of between 8 mm and 120 mm. For example, the axial length of the aerosolizable material 210 may be greater than 9 mm, or 10 mm, or 15 mm, or 20 mm. For example, the axial length of the aerosolizable material 210 may be less than 100 mm, or 75 mm, or 50 mm, or 40 mm.

In some examples, such as that shown in FIG. 5, the tobacco industry product 200 comprises a filter arrangement 220 for filtering aerosol or vapor released from the aerosolizable material 210 in use. Alternatively, or additionally, the filter arrangement 220 may be for controlling the pressure drop over a length of the tobacco industry product 200. The filter arrangement 220 may comprise one or more than one filter. The filter arrangement 220 could be of any type used in the tobacco industry. For example, the filter may be made of cellulose acetate. In some examples, the filter arrangement 220 is substantially cylindrical with a substantially circular cross section and a longitudinal axis. In other embodiments, the filter arrangement 220 may have a different cross section or not be elongate.

In some examples, the filter arrangement 220 abuts a longitudinal end of the aerosolizable material 210. In other examples, the filter arrangement 220 may be spaced from the aerosolizable material 210, such as by a gap and/or by one or more further components of the tobacco industry product 200. In some examples, the filter arrangement 220 may comprise an additive or flavor source (such as an additive- or flavor containing capsule or thread), which may be held by a body of filtration material or between two bodies of filtration material, for example.

The tobacco industry product 200 may also comprise a wrapper (not shown) that is wrapped around the aerosolizable material 210 and the filter arrangement 220 to retain the filter arrangement 220 relative to the aerosolizable material 210. The wrapper may be wrapped around the aerosolizable material 210 and the filter arrangement 220 so that free ends of the wrapper overlap each other. The wrapper may form part of, or all of, a circumferential outer surface of the tobacco industry product 200. The wrapper could be made of any suitable material, such as paper, card, or reconstituted aerosolizable material (e.g. reconstituted tobacco). The paper may be a tipping paper that is known in the art. The wrapper may also comprise an adhesive (not shown) that adheres overlapped free ends of the wrapper to each other, to help prevent the overlapped free ends from separating. In other examples, the adhesive may be omitted or the wrapper may take a different from to that described. In other examples, the filter arrangement 220 may be retained relative to the aerosolizable material 210 by a connector other than a wrapper, such as an adhesive. In some examples, the filter arrangement 220 may be omitted.

Once all, substantially all, or many of the volatilizable component(s) of the aerosolizable material 210 in the tobacco industry product 200 has/have been spent, the user may remove the tobacco industry product 200 from the heating chamber 110 of the device 100 and dispose of the tobacco industry product 200.

As noted above, the first angle $\alpha 1$ defined between the longitudinal axis A-A of the rod 10 and the outer tapered surface 11*s* of the first tapered portion 11 facilitates such removal of the rod 10 from the tobacco industry product 200. More specifically, the first angle $\alpha 1$ is selected so as to reduce the extent to which the aerosolizable material 210 is dragged along the rod 10 while the rod 10 is removed. This helps to avoid or reduce the extent to which bits of the consumed aerosolizable material 210 break away and subsequently deposit in the heating chamber 110. The user may subsequently re-use the device 100 with another such tobacco industry product 200.

Alternatively, or additionally, to providing the heating element with tapered portion(s), the heating element may have an outer surface that is configured to contact the aerosolizable material in use, wherein the outer surface has a surface roughness selected so as to reduce a friction force applied by the heating element to the aerosolizable material on removal of the heating element from the aerosolizable material, thereby to reduce the extent to which the aerosolizable material is dragged by the heating element while the heating element is removed from the aerosolizable material. For example, the outer surface may be polished, such as electro-polished, and/or the outer surface may be coated with a low-friction material. Example low-friction materials will be well known to the skilled person.

In some examples, the tobacco industry product 200 is sold, supplied or otherwise provided separately from the device 100 with which the tobacco industry product 200 is usable. However, in some examples, the device 100 and one or more of the tobacco industry products 200 may be provided together as a system, such as a kit or an assembly, possibly with additional components, such as cleaning utensils.

In order to address various issues and advance the art, the entirety of this disclosure shows by way of illustration and example various embodiments in which the claimed disclosure may be practiced and which provide for superior heating elements for non-combustible aerosol provision devices, superior non-combustible aerosol provision devices, and superior non-combustible aerosol provision systems. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other subject matter not presently claimed, but which may be claimed in future.

The invention claimed is:

1. A heating element for a non-combustible aerosol provision device comprising:

a rod having a longitudinal axis, a distal end portion, a first tapered portion and a second tapered portion each at a respective longitudinal position along the longitudinal axis;

wherein the second tapered portion extends from the distal end portion towards the first tapered portion and a cross-sectional area of the rod increases with distance from the distal end portion in each of the first tapered portion and the second tapered portion;

wherein a first angle between the longitudinal axis and an outer tapered surface of the first tapered portion is smaller than a second angle between the longitudinal axis and an outer tapered surface of the second tapered portion;

wherein a difference between the first and the second angle is between 5 to 10 degrees; and wherein the heating element is a resistive heater that is heated by passing electricity through the resistive heater.

2. The heating element of claim 1, wherein the first angle is between 0.5 degrees and 25 degrees.

3. A non-combustible aerosol provision device, comprising:

a heating chamber for receiving at least a portion of a tobacco industry product comprising aerosolizable material;

a heating element comprising a rod that protrudes into the heating chamber and is either coincident with, or parallel to, an axis of the heating chamber; and a heating device for causing heating of the rod thereby to cause heating of the aerosolizable material when the tobacco industry product is in the heating chamber;

wherein the rod has a distal end portion, and a first tapered portion and a second tapered portion each at a respective axial position along the axis;

wherein the second tapered portion extends from the distal end portion towards the first tapered portion, and wherein a cross-sectional area of the rod increases with distance from the distal end portion in each of the first tapered portion and the second tapered portion;

wherein a first angle between the axis and an outer tapered surface of the first tapered portion is smaller than a second angle between the axis and an outer tapered surface of the second tapered portion, wherein a difference between the first and the second angle is between 5 to 10 degrees; and wherein a length of the first tapered portion is equal to or greater than a length of the second tapered portion.

4. The non-combustible aerosol provision device of claim 3, wherein the axis is a central axis of the heating chamber.

5. The non-combustible aerosol provision device of claim 3, wherein the heating chamber is elongate and the axis is a longitudinal axis of the heating chamber.

6. The non-combustible aerosol provision device according to claim 3, wherein the heating element comprises:

a rod having a longitudinal axis, a distal end portion, a first tapered portion and a second tapered portion each at a respective longitudinal position along the longitudinal axis;

wherein the second tapered portion extends from the distal end portion towards the first tapered portion and a cross-sectional area of the rod increases with distance from the distal end portion in each of the first tapered portion and the second tapered portion; and wherein a first angle between the longitudinal axis and an outer tapered surface of the first tapered portion is smaller than a second angle between the longitudinal axis and an outer tapered surface of the second tapered portion.

7. A non-combustible aerosol provision system, comprising;

the non-combustible aerosol provision device according to claim 3; and the tobacco industry product comprising aerosolizable material, wherein the tobacco industry product is insertable into the heating chamber of the non-combustible aerosol provision device so that the second tapered portion and at least part of the first tapered portion penetrate the tobacco industry product.

8. The non-combustible aerosol provision system according to claim 7, wherein the tobacco industry product is insertable into the heating chamber of the non-combustible aerosol provision device so that the second tapered portion and at least part of the first tapered portion penetrate the aerosolizable material.

* * * * *